United States Patent [19]
Kaelin

[11] 3,979,294
[45] Sept. 7, 1976

[54] CLARIFICATION PLANT

[76] Inventor: Joseph Richard Kaelin, Villa Seeburg, CH-6374 Buochs, Switzerland

[22] Filed: Jan. 21, 1975

[21] Appl. No.: 542,812

Related U.S. Application Data

[63] Continuation-in-part of Ser. No. 308,600, Nov. 21, 1972, abandoned.

[30] Foreign Application Priority Data

Nov. 22, 1971 Switzerland.................... 17043/71

[52] U.S. Cl................... 210/195 S; 210/197; 210/219; 210/220; 261/91
[51] Int. Cl.²............... C02C 1/10; B01F 3/04
[58] Field of Search............ 210/4–7,15, 210/63, 194, 195, 197, 218–221, 242; 261/91

[56] References Cited
UNITED STATES PATENTS

| | | | |
|---|---|---|---|
| 2,054,395 | 9/1936 | Streander............ | 210/194 |
| 3,204,768 | 9/1965 | Daniel................. | 261/91 X |
| 3,444,076 | 5/1969 | Sekikawa et al....... | 210/6 |
| 3,470,092 | 9/1969 | Bernard............... | 261/91 X |
| 3,521,864 | 7/1970 | Welles, Jr............ | 261/91 X |
| 3,547,815 | 12/1970 | McWhirter........... | 210/220 X |
| 3,573,203 | 3/1971 | Kaelin................. | 210/242 X |
| 3,591,492 | 7/1971 | Neuspiel.............. | 210/195 X |
| 3,628,775 | 12/1971 | McConnell et al.... | 210/220 X |
| 3,647,324 | 3/1972 | Rafferty et al....... | 261/91 X |
| 3,722,679 | 3/1973 | Logue................. | 261/77 X |
| 3,724,667 | 4/1973 | McKinney............ | 210/7 X |
| 3,730,881 | 5/1973 | Armstrong............ | 210/6 |

*Primary Examiner*—Charles N. Hart
*Assistant Examiner*—Robert H. Spitzer
*Attorney, Agent, or Firm*—Oblon, Fisher, Spivak, McClelland & Maier

[57] ABSTRACT

A clarification plant has an activation tank which is provided with a surface ventilation rotor. Activated sludge from a re-clarification tank is recycled by means of a conduit connected to the re-clarification tank, an outlet aperture thereof being located in the suction zone of the rotor. The activated sludge is sucked from the conduit into the rotor. Oxygen or an oxygen mixture is added in finely divided form to the recycled activated sludge before it enters the rotor to aerate the same.

5 Claims, 2 Drawing Figures

CLARIFICATION PLANT

CROSS-REFERENCE TO CORRESPONDING APPLICATIONS

This application is a Continuation-In-Part application of U.S. application Ser. No. 308,600, filed by the same inventor on Nov. 21, 1972, now abandoned, and the same is incorporated herein in entirety by this reference thereto.

BACKGROUND OF THE INVENTION

The present invention relates to a clarification plant with at least one activation tank which is provided with a surface ventilation rotor provided adjacent the outlet of a vertically oriented conduit therein for recycling activated sludge emanating into the conduit from a re-clarification tank.

Clarification plants in which activated sludge is recycled from a reclarification tank into an activation tank are known. However, such known plants suffer from the disadvantage that it is necessary in order to recycle the activated sludge back into the activation tank to have an additional capacity-consuming conveyor unit, and the activated sludge in the activation tank comes into contact with too little oxygen per unit of time.

SUMMARY OF THE INVENTION

An object of the present invention therefore is to provide an improved clarification plant which alleviates these problems.

According to the present invention, a clarification plant is provided with at least one activation tank having a surface ventilation rotor associated therewith, the improvement being that a conduit connected to a re-clarification tank is substantially vertically oriented in the activation tank and is provided for recycling of activated sludge from the re-clarification tank, an outlet aperture of the conduit being located in a suction zone of the surface ventilation rotor, whereby the activated sludge located in the conduit is sucked, through the suction of the surface ventilation rotor, into the rotor, and that supply means are provided which add oxygen or an oxygen mixture to the recycled activated sludge prior to its entry into the surface ventilation rotor.

As, in the case of this clarification plant, the activated sludge is guided via a recycling conduit to a position directly in front of the suction aperture of the surface ventilation rotor and is enriched with oxygen or an oxygen mixture prior to entry into the rotor, there results a very thorough mixing of the activated sludge which has been supplied from the re-clarification tank and the oxygen or an oxygen mixture and the liquid located in the activation tank in the surface ventilation rotor. As is already known, the mixture produced in the surface ventilation rotor leaves the rotor outlet apertures and establishes contact with the oxygen or oxygen mixture via the liquid which is to be found in the activated tank.

It is expedient if the conduit intended to recycle the activated sludge extends in the activation tank over at least one part of the height of the tank in a vertical direction into the suction zone of the surface ventilation rotor, and that at least one supply conduit is provided to supply oxygen or an oxygen mixture into this vertically extending section of the conduit.

It may also be of advantage that the housing and/or design of the supply means is such that they introduce the oxygen or oxygen mixture into the suction zone of the surface ventilation rotor, and it is expedient in this case that underneath the suction aperture of the surface ventilation rotor there is housed a lead-in section for the oxygen or oxygen mixture, annular in shape and housed concentrically relative to the rotor and provided with outlet apertures.

In order to achieve a particularly intensive mixing and a high input of oxygen or an oxygen mixture into the liquid, it is expedient if the surface ventilation rotor has at least two blade-shaped faces housed concentrically with respect to each other, a dividing wall being provided between any two adjacent blade-shaped faces.

In order to achieve the desired circulating flow, it is of advantage if there is provided at the base of the activation tank, in axial alignment with the axis of rotation of the surface ventilation rotor, a flow-guide cone, for the liquid, with its tip directed upwards.

BRIEF DESCRIPTION OF THE DRAWINGS

Various other objects, features and attendant advantages of the present invention will be more fully appreciated as the same becomes better understood from the following detailed description when considered in connection with the accompanying drawings, wherein like reference numerals designate like or corresponding parts and in which.

DETAILED DESCRIPTION OF A PREFERRED EMBODIMENT

Figure 1:
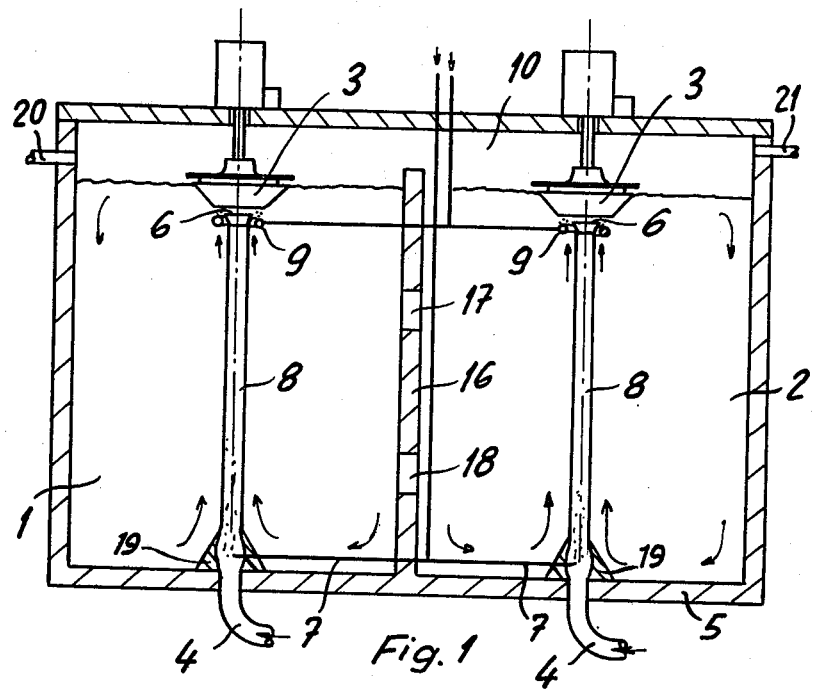
FIG. 1 is a section view taken through two adjacently housed activation tanks of a clarification plant constructed according to the present invention.

As can be seen from FIG. 1, two activation tanks 1 and 2 are provided, being housed directly adjacent to each other, and each of them is provided with a surface ventilation rotor 3 and a recycling conduit 4 for activated sludge emanating from a re-clarification tank, not shown.

The conduit 4 which serves to recycle the activated sludge emanating from the re-clarification tank extends from the base 5 of the respective one of the activation tanks 1 and 2 vertically into the suction zone of the surface ventilation rotor 3, with the result that the outlet aperture 6 of the conduit is located in the suction zone. The distance of the outlet aperture 6 of conduit 4 relative to the suction aperture of the surface ventilation rotor 3, as well as the diameter and the course of the supply conduit 4, must be selected so that the activated sludge located in the latter is sucked therethrough by the suction effect of the surface ventilation rotor 3. Thus, the maximum possible amount of activated sludge for recycling depends upon the speed of the surface ventilation rotor 3, or in other words, at no time is more activated sludge recycled than can be processed by the surface ventilation rotor 3.

In order to support the upward supply of the activated sludge in the recycling conduit 4 and simultaneously enrich the activated sludge with oxygen, as soon as possible and prior to entry into the surface ventilation rotor 3, pure oxygen or an oxygen mixture, such as, for example, air, is introduced via a lead-in conduit 7 into the vertically extending section 8 of the recycling conduit 4. If the oxygen or oxygen mixture were introduced into a horizontal conduit section of the recycling conduit 4, the result would be the formation of large bubbles of oxygen or oxygen mixture, and these would considerably increase the resistance to flow in the recycling conduit, and would additionally result in less oxygen being absorbed by the activated sludge. Thus the air being introduced into conduit section 8 through lead-in conduit 7 is introduced in finely divided form, or in as little and as many bubbles as possible, to properly and satisfactorily aerate the sludge.

There is additionally provided, directly beneath the suction aperture of the surface ventilation rotor 3, an annular-shaped lead-in section 9 for the pure oxygen or an oxygen mixture, such as, for example, air, and this is housed concentrically relative to the rotor and provided with suitable outlet apertures. This annular-shaped lead-in section 9 is housed parallel to the conduit section 8, so as to be vertically adjustable in order to exactly match all operating conditions.

The oxygen emerging from the annular-shaped lead-in section 9 likewise is in a finely divided form, or in the form of as many and as small bubbles as possible, and is mixed with the activated sludge emerging from the outlet aperture 6 prior to entry into the surface ventilation rotor 3, and then is mixed extremely intensively in the latter with the activated sludge and liquid emanating from the other activation tank.

Thus, with the air being introduced in as little as possible bubbles in the sludge-conduit 8, the outlet of which is in the suction zone of the surface ventilation rotor, the air not taken up in the sludge will be introduced by the rotor 3 in the liquid to be aerated, so that this air is not lost.

Because the sludge in the conduit 8 is very concentrated, it is possible to introduce oxygen with the lowest effort in the sludge for the biological process. If the sludge returned to the aeration tank is diluted with the water therein, much more effort is required to introduce the same quantity of oxygen into the liquid to get the same biological treatment effect.

By introducing air in fine divided form in the highly concentrated sludge and directing this aerated sludge directly into the inlet of a surface aerating rotor, much less power is necessary to introduce the oxygen necessary for the same output of the clarification plant.

It is, of course, also possible to mix pure oxygen or an oxygen mixture with the activated sludge which has been recycled from the re-clarification tank only via the lead-in conduit 7 or the annular-shaped lead-in section 9.

Figure 2:
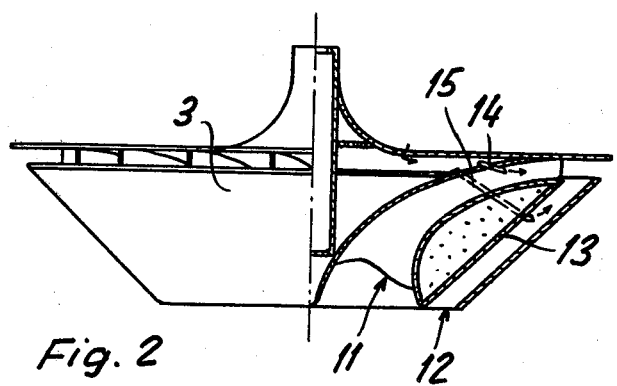
FIG. 2 is a section view taken through one of the surface ventilation rotors shown in FIG. 1.

The surface ventilation rotor 3 has, as can be seen from FIG. 2, two blade-shaped faces 11 and 12, housed concentrically in respect to each other, for increasing the mixing and the introduction of oxygen or an oxygen mixture from the open area 10 above the rotor into the liquid, a dividing wall 13 being provided between the two adjacent blade-shaped faces 11 and 12. Channels 14 and 15 serve to introduce oxygen or an oxygen mixture out of the area 10 of the activation tank into the individual blade channels, the liquid flowing through the individual blade channels producing a suction effect in channels 14 and 15 and sucking in the oxygen or oxygen mixture.

The intermediate wall 16 located between the two activation tanks 1 and 2 is provided with two apertures 17 and 18, formed one above the other, with the result that the liquid supplied to the tank 1 may flow through the apertures 17 and 18 into the activation tank 2, whence it is led off.

In order to achieve the desired circulatory movement of the liquid located in the activation tank, a flow-guide cone 19 is provided on the base 5 of the activation tank 1 or 2 with its tip directed upwards and in axial alignment with the axis of rotation of the surface ventilation rotor 3.

As the two activation tanks 1 and 2 are completely sealed, an inlet conduit 20 is further provided to introduce pure oxygen or an oxygen mixture such as, for example, air, into area 10, and an outlet conduit 21, which is as remote as possible from the inlet conduit 20, is provided for removing the excess gas.

Obviously, many modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. In a clarification plant provided with at least one gas-tight activation tank which is provided with a surface ventilation rotor, a re-clarification tank, inlet means for supplying sewage to said activation tank and outlet means for conducting activation sewage to said re-clarification tank, a conduit having one end vertically oriented and disposed in said activation tank directly below said surface ventilation rotor and being connected at its other end to said reclarification tank for recycling activated sludge concentrate from said reclarification tank, an outlet aperture in said one end of said conduit being located in a suction zone of said surface ventilation rotor directly therebelow whereby the activated sludge in said conduit is sucked upward through the suction of said surface ventilation rotor thereinto, the improvement comprising:

means for supplying substantially pure oxygen in a finely divided form to said other end of said conduit for application to the concentrated recycled activated sludge prior to the entry of said concentrated recycled activated sludge into said surface ventilation rotor.

2. A clarification plant according to claim 1, wherein said means for supplying substantially pure oxygen to said concentrated recycled activated sludge is also disposed about the periphery of said outlet aperture of said one end of said conduit for supplying said substantially pure oxygen to said concentrated recycled activated sludge as it emerges from said outlet aperture of said conduit immediately prior to entry into said surface ventilation rotor.

3. A clarification plant according to claim 2, wherein the surface ventilation rotor has at least two blade-shaped faces housed concentrically in respect of each other, a dividing wall being provided between adjacent blade-shaped faces for defining separate paths of upward flow through said surface ventilation rotor, whereby activated sludge emerging from said outlet aperture of said vertically oriented conduit is conveyed principally by the internal path while waste water in said activation tank is principally conveyed through the external flow path, such that mixing of the highly concentrated activated sludge with the waste water being clarified occurs only after emerging from the surface ventilation rotor, and means for introducing substantially pure oxygen from the top of said activation tank into the external and internal channels of said ventilation rotor.

4. A clarification plant according to claim 1, wherein at least two activation tanks are housed adjacent to each other and connected via at least one aperture, being located beneath the expected liquid level.

5. A clarification plant according to claim 1, wherein there is further provided at the base of the activation tank in axial alignment with the axis of rotation of said surface ventilation rotor, a flow-guide cone for the liquid having its tip upwardly directed.

* * * * *